(12) United States Patent
Reid et al.

(10) Patent No.: US 11,867,618 B2
(45) Date of Patent: Jan. 9, 2024

(54) SYSTEMS AND METHODS USING ACTIVE FTIR SPECTROSCOPY FOR DETECTION OF CHEMICAL TARGETS

(71) Applicant: Heriot-Watt University, Edinburgh (GB)

(72) Inventors: Derryck Telford Reid, Edinburgh (GB); Oguzhan Kara, Jena (DE)

(73) Assignee: Heriot-Watt University, Edinburgh (GB)

( * ) Notice: Subject to any disclaimer, the term of this patent is extended or adjusted under 35 U.S.C. 154(b) by 54 days.

(21) Appl. No.: 17/606,568

(22) PCT Filed: Apr. 17, 2020

(86) PCT No.: PCT/GB2020/050969
§ 371 (c)(1),
(2) Date: Oct. 26, 2021

(87) PCT Pub. No.: WO2020/217046
PCT Pub. Date: Oct. 29, 2020

(65) Prior Publication Data
US 2022/0205904 A1    Jun. 30, 2022

(30) Foreign Application Priority Data

Apr. 26, 2019    (GB) .................... 1905848

(51) Int. Cl.
*G01N 21/3504* (2014.01)
*G01J 3/02* (2006.01)
(Continued)

(52) U.S. Cl.
CPC ........ *G01N 21/3504* (2013.01); *G01J 3/0208* (2013.01); *G01J 3/4535* (2013.01);
(Continued)

(58) Field of Classification Search
CPC .......... G01N 21/3504; G01N 21/3563; G01N 21/3577; G01N 2021/1793;
(Continued)

(56) References Cited

U.S. PATENT DOCUMENTS

| 5,373,160 A | 12/1994 | Taylor |
| 5,982,486 A | 11/1999 | Wang |

(Continued)

FOREIGN PATENT DOCUMENTS

| WO | 199209877 A3 | 6/1992 | |
| WO | WO-9209877 A2 * | 6/1992 | ......... G01N 21/3518 |

(Continued)

OTHER PUBLICATIONS

Sandridge et al., "Using beam-steering mirrors and long-distance sources to extend coverage of long-path FTIRs", SPIE Proceedings, vol. 2366, pp. 194-202. (Year: 1955).*

(Continued)

*Primary Examiner* — Kiho Kim
(74) *Attorney, Agent, or Firm* — CHRISTENSEN O'CONNOR JOHNSON KINDNESS PLLC

(57) ABSTRACT

Active FTIR spectroscopy systems and methods for quantitative measurements of concentrations of chemical targets, such as gas, liquid and solid chemical targets, in an open-path measuring arrangement and a method of extracting an effective illumination spectrum of IR light illuminating chemical targets arranged in an open-path measuring arrangement.

24 Claims, 8 Drawing Sheets

(51) Int. Cl.

| | |
|---|---|
| *G01J 3/453* | (2006.01) |
| *G01N 21/3563* | (2014.01) |
| *G01N 21/3577* | (2014.01) |
| *G01N 21/17* | (2006.01) |
| *G01N 21/35* | (2014.01) |

(52) U.S. Cl.
CPC ..... *G01N 21/3563* (2013.01); *G01N 21/3577* (2013.01); *G01N 2021/1793* (2013.01); *G01N 2021/3595* (2013.01)

(58) Field of Classification Search
CPC ... G01N 2021/3595; G01N 2021/3513; G01N 2201/129; G01N 21/35; G01J 3/0208; G01J 3/4535; G01J 3/06; G01J 3/10; G01J 3/453
See application file for complete search history.

(56) References Cited

U.S. PATENT DOCUMENTS

| | | |
|---|---|---|
| 7,342,664 B1 | 3/2008 | Radziszewski |
| 8,358,420 B1 | 1/2013 | Dewitt |

FOREIGN PATENT DOCUMENTS

| | | |
|---|---|---|
| WO | 2018213212 A1 | 11/2018 |
| WO | 2020217046 A1 | 10/2020 |

OTHER PUBLICATIONS

Combined Search and Examination Report dated Oct. 29, 2019, issued in corresponding United Kingdom Application No. GB 1905848.6, filed Apr. 26, 2019, 9 pages.
International Search Report and Written Opinion dated Sep. 16, 2020, issued in corresponding International Application No. PCT/GB2020/050969, filed Apr. 17, 2020, 22 pages.
Schütze, C., et al. "Ground-based remote sensing with open-path Fourier-transform infrared (OP-FTIR) spectroscopy for large-scale monitoring of greenhouse gases." Energy Procedia 37 (2013): 4276-4282.
Smith, T. E. L., et al. "Absolute accuracy and sensitivity analysis of OP-FTIR retrievals of CO 2, CH 4 and CO over concentrations representative of"clean air" and"polluted plumes"." Atmospheric Measurement Techniques 4.1 (2011): 97-116.
Cossel, Kevin C., et al. "Gas-phase broadband spectroscopy using active sources: progress, status, and applications." JOSA B 34.1 (2017): 104-129.
Rieker, Gregory B., et al. "Frequency-comb-based remote sensing of greenhouse gases over kilometer air paths." Optica 1.5 (2014): 290-298.
Nugent-Glandorf, Lora, Fabrizio R. Giorgetta, and Scott A. Diddams. "Open-air, broad-bandwidth trace gas sensing with a mid-infrared optical frequency comb." Applied Physics B 119.2 (2015): 327-338.
Gurton, Kristan P., David Ligon, and Rachid Dahmani. "Measured infrared optical cross sections for a variety of chemical and biological aerosol simulants." Applied optics 43.23 (2004): 4564-4570.
Neuberger, Sabine, and Christian Neusüß. "Determination of counterfeit medicines by Raman spectroscopy: Systematic study based on a large set of model tablets." Journal of pharmaceutical and biomedical analysis 112 (2015): 70-78.
Su, Wen-Hao, and Da-Wen Sun. "Fourier transform infrared and Raman and hyperspectral imaging techniques for quality determinations of powdery foods: A review." Comprehensive Reviews in Food Science and Food Safety 17.1 (2018): 104-122.
Kazarian, Sergei G., and KL Andrew Chan. "Micro-and macro-attenuated total reflection Fourier transform infrared spectroscopic imaging." Applied spectroscopy 64.5 (2010): 135A-152A.
"HazMatID™ Elite," Technical Information, Smiths Detection, 2019, <https://www.smithsdetection.com/products/hazmatid-elite> [Retrieved Oct. 25, 2021], 2 pages.
Grdadolnik, Jože. "ATR-FTIR spectroscopy: Its advantage and limitations." Acta Chimica Slovenica 49.3 (2002): 631-642.
Deisingh, Anil K. "Pharmaceutical counterfeiting." Analyst 130.3 (2005): 271-279.
Sharpe, Steven W., et al. "Gas-phase databases for quantitative infrared spectroscopy." Applied spectroscopy 58.12 (2004): 1452-1461.
E. J. Dlugokencky, ESRL GMD Data Set, National Science Foundation, description creation time: Jul. 7, 2016.
Rothman, Laurence S., et al. "The HITRAN2012 molecular spectroscopic database." Journal of Quantitative Spectroscopy and Radiative Transfer 130 (2013): 4-50.
George M. Russwurm, and Jeffrey W. Childers, "FT-IR Open-path Monitoring Guidance Document," U.S. Environmental Protection Agency, Human Exposure and Atmospheric Sciences Division, National Exposure Research Laboratory, 1999.
"D-fenceline™ and OPS," Bruker, Atmosfir, 2019, <https://brukeropenpath.com/atmosfir-d-fenceline/> [Retrieved Oct. 21, 2021], 8 pages.
Kara, Oguzhan, et al. "Dual-comb spectroscopy in the spectral fingerprint region using OPGaP optical parametric oscillators." Optics Express 25.26 (2017): 32713-32721.
Maidment, Luke, Peter G. Schunemann, and Derryck T. Reid. "White powder identification using broadband coherent light in the molecular fingerprint region." Optics express 26.19 (2018): 25364-25369.
Marshall, Timothy L., et al. "An introduction to open-path FT-IR atmospheric monitoring." Environmental science & technology 28.5 (1994): 224A-231A.
Zhang, Zhaowei, et al. "Stand-off spectroscopy and chemical sensing using a femtosecond optical parametric oscillator." CLEO: Laser Science to Photonic Applications, Optical Society of America, 2014.
Kelly, James F., et al. "Applications of wideband FM spectroscopy to environmental and industrial process monitoring." Proceedings of SPIE vol. 3127. Oct. 31, 1997, pp. 64-102.
Reid, Derryck T., Zhaowei Zhang, and Christopher R. Howle. "Active FTIR-based standoff detection in the 3-4 micron region using broadband femtosecond optical parametric oscillators." Chemical, Biological, Radiological, Nuclear, and Explosives (CBRNE) Sensing XV. Proceedings of SPIE vol. 9073. 907302. May 2014.
Maidment, Luke, et al. "Stand-off detection of aerosols using mid-infrared backscattering Fourier transform spectroscopy." Optics and Photonics for Counterterrorism, Crime Fighting, and Defence XII. vol. 9995. International Society for Optics and Photonics, 2016.
Zhang, Zhaowei, et al. "Active FTIR-based stand-off spectroscopy using a femtosecond optical parametric oscillator." Optics letters 39.20 (2014): 6005-6008.
Maidment, Luke, et al. "Stand-off identification of aerosols using mid-infrared backscattering Fourier-transform spectroscopy." Optical Society of America, 2016.
Kara, Oguzhan, et al. "Open-path remote sensing for multi-species gas detection using a broadband optical parametric oscillator." Real-time Measurements, Rogue Phenomena, and Single-Shot Applications V. Proceedings of SPIE vol. 11265. 112650Q. Mar. 2020.
Examination Report dated Nov. 2, 2023, issued in corresponding European Application No. 20729138.6, filed Apr. 17, 2020, 10 pages.
Luis H. Espinoza et al., "Generation of Synthetic Background Spectra by Filtering the Sample Interferogram in FT-IR", Society for Applied Spectroscopy, 1998, pp. 375-379, vol. 52, No. 3.
Peter G. Zemek et al., "Portable open-path optical remote sensing (ORS) Fourier transform infrared (FTIR) instrumentation miniaturization and software for point and click real-time analysis", Next-Generation Spectroscopic Technologies III, 2010, pp. 1-12, vol. 7680, 2010 SPIE—CCC code: 0277-786X/10/$18—doi: 10.1117/12.845995.
Esteban Garcia-Cuesta et al., "Application of Neural Networks to Atmospheric Pollutants Remote Sensing", LIR—Laboratorio de Sensores y Teledeteccion IR, Departamento de Fisica, Universidad

(56) References Cited

OTHER PUBLICATIONS

Carlos III de Madrid Departamento de Ciencias, Universidad Europea de Madrid, 2007, pp. 589-598, Springer-Verlag Berlin Heidelberg.
Daewoong Hong et al., "Improved Methods for Performing Multivariate Analysis and Deriving Background Spectra in Atmosphere OpenPath FT-IR Monitoring", Society for Applied Spectroscopy, 2003, pp. 299-308, vol. 57, No. 3.

* cited by examiner

SYSTEMS AND METHODS USING ACTIVE FTIR SPECTROSCOPY FOR DETECTION OF CHEMICAL TARGETS

TECHNICAL FIELD

The description relates generally to the field of active FTIR spectroscopy systems and methods, and, in particular, to active FTIR spectroscopy systems and methods used for the detection of chemical targets, such as gas, liquid and solid chemical targets. More particularly, the disclosure relates to active FTIR spectroscopy systems and methods for quantitative measurements of concentrations of chemical targets in an open-path measuring arrangement, and to a method of extracting an effective illumination spectrum of IR (infrared) light illuminating chemical targets arranged in an open-path measuring arrangement.

BACKGROUND

Fugitive hydrocarbon emissions cost the energy sector $5B per year, account for 12% of greenhouse gas emissions and jeopardize safety and public health.

The most advanced technique for remote emission measurements of gases is differential absorption lidar (DIAL), in which intense IR pulses are directed into the atmosphere and returned to a ground-based detector by weak scattering from airborne particles. However, DIAL's use of narrow line (1 $cm^{-1}$) dye laser technology restricts it to measuring only one chemical target at a time and makes such systems large and inefficient.

By contrast, Fourier transform infrared (FTIR) spectroscopy, already a gold standard for laboratory chemical identification, is naturally broadband and offers far wider detection coverage than DIAL in that, in an open-path measuring arrangement, FTIR systems can detect several atmospheric gases.

Active open-path mid-IR Fourier-transform spectroscopy using thermal sources is already used for quantitative hydrocarbon emissions monitoring in and around petrochemical sites, at landfill sites and in agricultural contexts (T. L. Marshall, C. T. Chaffin, R. M. Hammaker, and W. G. Fateley, "An introduction to open-path FT-IR atmospheric monitoring," Environmental Science & Technology 28, 224A-232A, 1994; C. Schütze, S. Lau, N. Reiche, U. Sauer, H. Borsdorf, and P. Dietrich, "Ground-based Remote Sensing with Open-path Fourier-transform Infrared (OP-FTIR) Spectroscopy for Large-scale Monitoring of Greenhouse Gases," Energy Procedia 37, 4276-4282, 2013; T. E. L. Smith, M. J. Wooster, M. Tattaris, and D. W. T. Griffith, "Absolute accuracy and sensitivity analysis of OP-FTIR retrievals of $CO_2$, $CH_4$ and CO over concentrations representative of "clean air" and "polluted plumes,""" Atmospheric Measurement Techniques 4, 97-116, 2011). This spectroscopy system typically benefits from resolutions of around 0.5 $cm^{-1}$ (K. C. Cossel, E. M. Waxman, I. A. Finneran, G. A. Blake, J. Ye, and N. R. Newbury, "Gas-phase broadband spectroscopy using active sources: progress, status, and applications [Invited]," J. Opt. Soc. Am. B 34, 104-129, 2017). This resolution is sufficient for identification of gas species, but presents difficulties when absorption lines of multiple species are spectrally overlapped.

Laser-based active FTIR spectroscopy offers higher resolution, providing the capability to distinguish similar gases, such as, for example, methane and ethane, hence making it possible to separate petrochemical methane contributions—which are accompanied by a weak ethane signature—from biogenic methane sources (such as cattle, landfill, compost)—which only produce methane.

Quantitative high resolution open-path gas sensing was first achieved in the near-infrared using an Er:fiber dual-comb system which provided 100-MHz resolution spectroscopy of $CO_2$, $CH_4$, $H_2O$, HDO and $^{13}CO_2$ across a 2 km path (G. B. Rieker, F. R. Giorgetta, W. C. Swann, J. Kofler, A. M. Zolot, L. C. Sinclair, E. Baumann, C. Cromer, G. Petron, C. Sweeney, P. P. Tans, I. Coddington, and N. R. Newbury, "Frequency-comb-based remote sensing of greenhouse gases over kilometer air paths," Optica 1, 290, 2014). This was followed by a demonstration in the mid-infrared at 3.25 μm using a single Yb:laser-pumped OPO (optical parameter oscillator) to measure atmospheric water and methane over a 26 m path at 700-MHz resolution with a virtually imaged phase array spectrometer (L. Nugent-Glandorf, F. R. Giorgetta, and S. A. Diddams, "Open-air, broad-bandwidth trace gas sensing with a mid-infrared optical frequency comb," Applied Physics B 119, 327-338, 2015). However, these open-path laser FTIR systems are not eye-safe and do not possess enough resolution to enable separate identification of multiple species with absorption lines which are spectrally overlapped. This is a particularly disadvantageous considering that absorption lines from atmospheric background levels of water and methane are also present in the measured spectra.

The main problem to address is to design an active open-path FTIR system with sufficient collection aperture, laser power and detector sensitivity which allows simultaneous quantitative measurements of atmospheric background levels of water and methane, even in the presence of strong absorption from control gas cells.

The present disclosure discloses a new active FTIR spectroscopy system which is eye-safe and capable of operating at sub-0.1 $cm^{-1}$ resolution to allow simultaneous detection of multiple gas species, even in the presence of atmospheric background levels of water and methane. Furthermore, the system of the present disclosure is configured to simultaneously measure actual concentrations of several chemical targets arranged in an open-path measuring arrangement.

Aerosols are small particles of solid or liquid material suspended in air, and typically with a size below 10 μm. Due to their implication in a variety of human health conditions, and their role as a dispersal mechanism for accidental and deliberate release of toxic chemicals, the identification of airborne aerosol particulates is of major interest. Furthermore, the detection of aerosolised airborne threats, such as chemical warfare agents (CWAs) or toxic industrial chemicals, is important in mitigating the damage they could cause.

Optical techniques based on recording the characteristic chemical absorption (or Mie-scattering spectral signature) of aerosol particles offer an instantaneous means of identifying potentially hazardous airborne particulates. These techniques work by detecting the total amount of energy lost by the optical radiation incident on an aerosol particle.

To date, several optical techniques have been reported in an attempt to develop systems to measure the optical cross sections for chemical or biological aerosols, but have been limited in their abilities to provide complete aerosol identification. Gurton (K. P. Gurton, D. Ligon, and R. Dahmani, Appl. Opt. 43, 4564, 2004) used a Nernst glower source covering a broad spectral band (3-13 μm) transmitted through a chamber containing aerosol to measure the extinction with a FTIR spectrometer. While direct particulate sampling can play a role in assessing the size, type, and presence of aerosol particles, it is normally not an open-path (closed chamber is used) nor a real-time monitoring procedure and can over-/under-estimate the concentration of aerosol species.

The use of backscattered light for stand-off identification offers a reduced risk of harm from dangerous aerosols by avoiding the need to collect a sample for analysis, therefore eliminating the possibility of human contact with a toxic material. Surprisingly, despite previous studies, there appear to have been no attempts to use IR backscattering for identification of aerosols.

The main problem to address is to design a FTIR system which is capable of detection and identification of chemical and/or biological aerosols based on IR backscattering FTIR spectroscopy.

The present disclosure discloses a new active FTIR spectroscopy system for identifying the chemical constituents of aerosols by measuring the broadband spectrum of mid-IR radiation backscattered by aerosol particles. Furthermore, the FTIR system disclosed by the present disclosure enables the synchronous collection of the reference and backscattered mid-IR spectra.

Various agendas motivate the identification of white powders, such as detecting counterfeit pharmaceuticals (A. K. Deisingh, "Pharmaceutical counterfeiting," Analyst 130, 271-279, 2005; S. Neuberger and C. Neususs, "Determination of counterfeit medicines by Raman spectroscopy: Systematic study based on a large set of model tablets," J. Pharm. Biomed. Anal. 112, 70-78, 2015) and foodstuff analysis (W.-H. Su and D.-W. Sun, "Fourier transform infrared and raman and hyperspectral imaging techniques for quality determinations of powdery foods: a review," Compr. Rev. Food Sci. Food Saf. 17, 104-122, 2017). Fourier-transform spectroscopy can discriminate between materials according to their chemistry and crystallography, expressed by characteristic signatures of absorption frequencies in the 25-50 THz region (833-1667 $cm^{-1}$; 6-12 μm).

Typically, Fourier-transform spectroscopy of powders proceeds via the attenuated total internal reflection (ATR) method, in which intimate contact between a solid sample and the ATR cell is commonly ensured by applying high pressure (S. Kazarian and K. Chan, "Micro- and macro-attenuated total reflection Fourier transform infrared spectroscopic imaging. Plenary Lecture at the 5th International Conference on Advanced Vibrational Spectroscopy, 2009, Melbourne, Australia," Appl. Spectrosc. 64, 135A-152A, 2010). Despite being an established field-based approach (Smiths Detection, "HazMatID," www.smithsdetection.com at the following path: /products/hazmatid-elite/), the ATR FTIR technique encounters a number of limitations (J. Grdadolnik, "ATR-FTIR spectroscopy: its advantages and limitations," Acta Chim. Slov. 49, 631-642, 2002), and crucially requires contact between the sample and the ATR interface, risking exposing a user to hazardous materials, or contaminating evidence at a crime scene.

By contrast, diffuse reflectance Fourier-transform spectroscopy requires no sample preparation and is a non-contact method, but is difficult to implement using the spatially incoherent thermal sources utilised successfully in ATR embodiments.

The spatially coherent nature of the OPGaP OPOs (orientation-patterned gallium phosphide) (optical parametric oscillator), together with their high average power (up to 100 mW from 5-9 μm) enables identification of solids and liquids using a FTIR spectroscopy system that works by backscattering the beam from the sample surface, avoiding the physical contact associated with assays (like ATR cells). Diagnostically useful information does not demand high resolution—liquids and solids exhibit broad absorption features, so $cm^{-1}$-level resolution is sufficient. But unique identification of chemicals makes it important to capture information over a broad bandwidth.

The main problem to address is to design a FTIR system capable of identifying visually indistinguishable powder samples and which benefits from the spatial coherence and high average powers of OPOs.

The present disclosure discloses a new active FTIR system configured to identify visually indistinguishable powders from spectra with distinctive features between 8.2-8.9 μm using coherent broadband mid-IR light from an OPO, even when measurements were repeated with significantly weaker signals in an open-path measurement arrangement. Capable of operating at sub-0.1 $cm^{-1}$ resolution, the present FTIR system allows for diagnostic features to be observed in the IR response spectra from all the powders under test by means of observing diffusely reflected light from the surface of the powder.

Problem to be Solved

There is a need for improvements in active FTIR spectroscopy systems used for eye-safe and stand-off quantitative measurements of concentrations of chemical targets arranged in an open-path measuring arrangement.

Therefore it is an object of the present disclosure to provide an eye-safe active FTIR spectroscopy system based on a broadband ultrafast OPO (optical parametric oscillator) operating in the 1 μm to 16 μm wavelength range and capable of acquiring sub-0.1-$cm^{-1}$ resolution to allow detection of multiple chemical species and to measure actual concentrations of several chemical species arranged in an open-path measuring arrangement.

It is a further object of this disclosure to provide an active FTIR spectroscopy system with an OPO configured to deliver a broad range of average output powers spanning from as little as 1 mW to powers in excess of 500 mW to allow identification of chemical targets in open-path measuring arrangements with or without non-optically or optically compliant scattering aids for the chemical targets (to aid the diffuse reflectance and/or backscattering of incident IR light by the chemical targets).

It is a further object of this disclosure to provide an active FTIR spectroscopy system with sufficient collection aperture, OPO laser power and detector sensitivity which is capable of identifying the chemical compositions of several chemical targets in an open-path measuring arrangement with targets arranged as close as 0.1 m from the IR illumination light or at distances exceeding 70 m from the IR illumination light.

It is yet a further object of this disclosure to provide a method of calculating the envelope of the illumination spectrum of the IR light incident on the chemical targets to allow for accurate quantitative measurements of concentrations of chemical targets in open-path (or free-space) measuring arrangements where unknown contributions (to the illumination spectral envelope) from atmosphere or the light propagation path are to be expected.

SUMMARY OF THE DISCLOSURE

In accordance with a first aspect of the disclosure, there is provided an active FTIR spectroscopy system for quantitative measurements of concentrations of chemical targets in an open-path measuring arrangement, the system comprising:

a) an illumination source comprising an optical parametric oscillator configured to generate broadband IR light,
b) a calibration source configured to generate calibration light,
c) a scanning interferometer arranged to synchronously receive each of the broadband IR light and the calibration light, and then modulate each of the received broadband IR light and calibration light over a scanning period, with the received calibration light being configured to deduce optical path differences introduced by the scanning interferometer over the scanning period for each of the modulated broadband IR light and the modulated calibration light,
d) a launch system for illuminating the chemical targets with the modulated broadband IR light,
e) a collector system for receiving broadband IR light spectrally-modulated by the chemical targets, wherein the launch system is configured so that an optical axis of a launching path is substantially co-aligned with an optical axis of the collector system,
f) a detector system for detecting and then recording interference fringes generated by the spectrally-modulated broadband IR light and by the modulated calibration light, and
g) a non-transitory computer readable medium encoded with a computer program, wherein the computer program comprises instructions stored therein for causing a computer processor to perform a plurality of functions to simultaneously compute concentrations of each of the chemical targets from spectra of the recorded interference fringes generated by the spectrally-modulated broadband IR light and by the modulated calibration light.

The skilled person would understand "broadband IR light" to mean IR light having a wide spectral coverage spanning more than one feature (absorption, backscattering or diffused reflection) of interest for measuring using an FTIR system.

The skilled person would understand "active FTIR system" to mean a system producing its own light (cf. a passive system, in which ambient light, e.g. sunlight, is used as the illumination source).

The skilled person would understand "open-path measuring arrangement" (or "stand-off detection") to mean a measuring set-up for detecting chemical targets without physical contact with the chemical targets, and normally with an optical system situated some distance away from the chemical targets (or target surfaces) being measured.

The open-path measuring arrangement may be a monostatic arrangement (whereby the illumination source and the collector & detector systems are arranged on the same side of the chemical targets) or a bistatic arrangement (whereby the illumination source and the collector & detector systems are arranged on either side of the chemical targets).

The optical parametric oscillator may comprise a nonlinear crystal tunable to generate broadband IR light with wavelengths from 1 μm to 16 μm, preferably from 2.5 μm to 4.5 μm, more preferably from 2.8 μm to 3.9 μm, and even more preferably from 3.1 μm to 3.5 μm.

For measuring concentrations of gaseous chemical targets, the nonlinear crystal of the OPO may be tuned to generate broadband IR light in the mid-IR range, such as preferably from 2.8 μm to 3.9 μm, or more preferably from 3.1 μm to 3.5 μm.

For measuring concentrations of liquid chemical targets (such as, for example, aerosols), the nonlinear crystal of the OPO may be tuned to generate broadband IR light in the mid- to longwave-IR range, such as preferably from 2 μm to 12 μm, or more preferably from 2.5 μm to 4 μm.

For measuring concentrations of solid chemical targets (such as, for example, powders), the nonlinear crystal of the OPO may be tuned to generate broadband IR light in the mid- to longwave-IR range, such as preferably from 2 μm to 12 μm, or more preferably from 2.5 μm to 4 μm.

The nonlinear crystal may comprise any one of a birefringently-phasematched, quasi-phasematched or randomly phasematched crystal of lithium niobate, MgO-PPLN, potassium titanyl phosphate, potassium titanyl arsenate, cadmium titanyl phosphate, cadmium titanyl arsenate, lithium tantalate, barium borate, lithium triborate, gallium arsenide, gallium phosphide, gallium nitride, zinc selenide, silver gallium sulphide, silver gallium selenide, bismuth borate, zinc germanium phosphide, cadmium silicon phosphide, gallium selenide. Preferably, the nonlinear crystal is a magnesium oxide (MgO)-doped periodically poled lithium niobite (PPLN) crystal (MgO-PPLN) with nine grating periods.

The optical parametric oscillator may be configured to generate broadband IR light with an average output power of at least 10 mW, preferably at least 50 mW, more preferably at least 250 mW, and even more preferably at least 500 mW.

For measuring concentrations of gaseous chemical targets, the OPO may be configured to generate broadband IR light with an average output power of at least 200 mW, preferably at least 300 mW.

For measuring concentrations of liquid chemical targets, the OPO may be configured to generate broadband IR light with an average output power of at least 10 mW, preferably at least 300 mW.

For measuring concentrations of solid chemical targets, the OPO may be configured to generate broadband IR light with an average output power of at least 10 mW, preferably at least 300 mW.

The optical parametric oscillator may be configured to generate broadband IR light with a repetition rate from 1 MHz to 20 GHz, preferably from 10 MHz to 10 GHz, more preferably from 70 MHz to 1 GHz, and even more preferably from 90 MHz to 500 MHz.

For measuring concentrations of gaseous chemical targets, the OPO may be configured to generate broadband IR light with a repetition rate from 1 MHz to 20 GHz, preferably from 70 MHz to 1 GHz.

For measuring concentrations of liquid chemical targets, the OPO may be configured to generate broadband IR light with a repetition rate from 1 MHz to 20 GHz, preferably from 70 MHz to 1 GHz.

For measuring concentrations of solid chemical targets, the OPO may be configured to generate broadband IR light with a repetition rate from 1 MHz to 20 GHz, preferably from 70 MHz to 1 GHz.

The calibration source may comprise any one of a wavelength stabilised laser source or a narrow-line diode laser source, such as a DFB (distributed feedback) laser or a VCSEL (vertical-cavity surface-emitting laser). The skilled person would understand "wavelength stabilized" to mean the addition of a separate reference against which to "lock" the wavelength. And this can be done by using an etalon. The calibration source may comprise a HeNe laser.

The scanning interferometer may be configured to modulate the received broadband IR light with a resolution of less than 0.5 cm$^{-1}$, preferably less than 0.1 cm$^{-1}$, more preferably less than 0.07 cm$^{-1}$, and even more preferably less than 0.05 cm$^{-1}$.

For measuring concentrations of gaseous, liquid and solid chemical targets, the scanning interferometer may be configured to generate broadband IR light with a preferred resolution less than 0.1 cm$^{-1}$ in order to be able to resolve lines of multiple chemical species that are spectrally overlapped.

The scanning interferometer may be a scanning Michaelson interferometer, or a scanning Mach-Zehnder interferometer.

The scanning interferometer may employ a 1-cm-diameter beam with a measured M2 (beam parameter) value of 1.05. The beam parameter and diameter affect how the beam diffracts and therefore the range that can be achieved before the expansion of the beam reduces the collection efficiency of the system. The skilled person would envisage performing the measurement with a high-quality beam with low divergence as these requirements are preferred in, for example, allowing non-compliant scattering aids (versus optical or compliant scattering aids, such as high-quality retroreflectors and mirrors) to be used for open-path measuring arrangements.

The scanning interferometer may be configured to modulate the received broadband IR light at scanning rates from 0.1 Hz to 1000 Hz, preferably from 0.5 Hz to 100 Hz, more preferably from 0.7 Hz to 10 Hz.

The working principle of the scanning interferometer is to create two replica waveforms and then modulate their relative phase. For measuring concentrations of gaseous, liquid and solid chemical targets, the scanning interferometer may be configured to generate broadband IR light at scanning rates preferably from 0.7 Hz to 10 Hz, or even more preferably from 0.7 Hz to 2 Hz. These fast scanning rates permit more rapid data acquisition and allow a greater number of spectra to be averaged in a given time, with the potential for increasing the signal:noise of the measurement.

The scanning interferometer may be configured to modulate the received broadband IR light with an average power of at least 1 mW, preferably at least mW, more preferably at least 70 mW, and even more preferably at least 100 mW.

The skilled person would appreciate that there is a trade-off between using low powers (as low as 1 mW)—which are eye-safe, but require compliant scattering aids (i.e., high-quality retroreflectors and mirrors) and/or averaging over longer periods of measuring time—, and higher powers (typically below 100 mW)—which could either require non-compliant scattering aids (such as, for example, a simple Al foil) or no scattering aids at all, therefore enabling scattering from existing infrastructure (e.g. buildings, trees, walls) to be used.

The scanning interferometer comprises at least one moving retroreflector, the moving retroreflector being arranged to increase the optical paths introduced by the scanning interferometer over the scanning period for each of the modulated broadband IR light and the modulated calibration light.

Preferably, the scanning interferometer comprises two co-moving retroreflectors situated in opposite arms of the scanning interferometer, such that each interferogram is obtained by varying the optical path difference (OPD) between the two arms, each of which may include a system of mirrors to achieve multiple passes of each retroreflector, and in such a way, amplify the OPD to be several times larger than the physical movement of each retroreflector. (FIGS. 2 and 3 show a specific embodiment of the scanning interferometer where the physical movement of the retroreflector assembly results is an OPD of 8 times this distance).

The launch system may comprise a steering arrangement, the steering arrangement comprising a steering mirror or a steering prism (such as a Risley prism).

The launch system is configured so that an optical axis of a launching path is substantially co-aligned with an optical axis of the collector system. Preferably the steering arrangement comprises a steering mirror arranged at 45° with respect to the optical axis of the launching path.

Alternatively, the active FTIR system may do away with the steering arrangement by arranging the chemical targets directly into the path of the modulated IR illumination light (rather than the modulated IR beam being steered onto the chemical targets by the steering arrangement).

The collector system may comprise a telescope, such as a reflecting telescope or a refracting telescope. The reflecting telescope may be a Newtonian, a Cassegrain or a Gregorian telescope. The refracting telescope may be a Keplerian or Galilean, or variations of these, and may employ achromatic lenses.

The collector system may further comprise an optical relay arrangement, such as one or more of a mirror, a lens or a prism, or a combination thereof, for relaying the received spectrally-modulated broadband IR light onto the detector system.

A preferred embodiment of the active FTIR system may comprise a layout where the steering arrangement of the launch system is configured to be arranged adjacent the optical relay arrangement of the collector system such that the optical axis of the launching path is co-aligned with the optical axis of the collector system.

A variation of the preferred embodiment of the active FTIR system may comprise a layout where the modulated IR light is coupled-out (to illuminate the chemical targets) via the telescope of the collector system itself, and so combining the functionality of the set of launch & collection systems. In such a layout, the modulated IR light would be coupled into the system confocally with the detector system (with a requirement of optical axis coalignment still be required).

The detector system may comprise a combination of an IR detector for detecting spectra of interference fringes generated by the spectrally-modulated broadband IR light and a photodiode or a phototransistor for detecting spectra of interference fringes generated by the modulated calibration light.

The IR detector may be a cooled detector, such as a thermoelectrically cooled detector, a cryogenically (i.e., liquid-nitrogen) cooled detector (i.e., a photodiode) or a passively cooled detector.

The IR detector may comprise an InSb photodiode (which may be liquid-nitrogen cooled), a photoconductive detector (such as a MCT, PbS, PbSe or NbN detector), a superconducting nanowire detector (such as a NbN nanowire) or a bolometric detector.

The photodiode for detecting the calibration light may comprise a Si, Ge, GaAs, GaAsP, InGaAs, InGaAsP or AlGaAs photodiode.

Preferably the detector system comprises a combination of a liquid-nitrogen-cooled InSb photodiode and a Si photodiode. Alternatively, the detector system comprises a combination of an MCT detector and any one of a Si, Ge, GaAs, GaAsP, InGaAs, InGaAsP or AlGaAs photodiode.

The detector system may further comprise a digital signal acquisition system configured to record at least one spectrum of interference fringes generated by the spectrally-modulated broadband IR light in synchronism with at least one spectrum of interference fringes generated by the modulated calibration light such that the interference fringes of the modulated calibration light are configured to provide an accurate timebase calibration for the interference fringes of the spectrally-modulated broadband IR light to enable calculating an accurate wavelength scale for the at least one spectrum of interference fringes generated by the spectrally-modulated broadband IR light.

The broadband IR light spectrally-modulated by the chemical targets may comprise spectral-modulation by backscattering and/or absorption and/or diffuse reflectance of the broadband IR light.

The skilled person would understand "scattering" or "backscattering" to mean IR light returned by the chemical targets; "absorption" to mean IR light from which energy has been removed at specific wavelengths due to interaction with molecules in the chemical targets and/or atmosphere; and "diffuse reflectance" to mean IR light reflected by surfaces of solid chemical targets.

The plurality of functions may comprise simultaneously computing concentrations of each of the chemical targets by
a) performing calibration and Fourier transformation of the recorded spectra of interference fringes generated by the spectrally-modulated broadband IR light and by the modulated calibration light to produce at least one absorption spectrum for the chemical targets,
b) fitting library absorption spectra for each of the chemical targets and an extracted illumination spectrum of the generated broadband IR light to the at least one absorption spectrum, and then
c) calculating concentrations of each of the chemical targets from said produced and said fitted spectrum.

The "library spectra" may comprise data from publicly available literature libraries and/or data from libraries created by the applicant of the present disclosure.

The chemical targets comprise IR-absorbing chemical species, such a gaseous, liquid or solid chemical species.

The gaseous chemical targets may comprise any one or a combination of any one of natural gas, oil spills, gases from carbon capture and storage systems, shale gas, landfill management gases, fugitive volatile organic compounds, thermogenic gas sources, biogenic gas sources or fence-line monitoring gases.

The skilled person would understand the applicability of the present active FTIR spectroscopy system to: detection of constituents of natural gas to include quantification to enable estimation of calorific value; detection of vaporised gases from oil spills; measurements of $CO_2$ and related impurities for carbon capture and storage systems; constituent measurements of shale gas for estimation of calorific value; constituent measurements of gases emitted from landfill for estimation of calorific value and for injection to the gas grid or gas engines; measurements of fugitive volatile organic compounds from chemical processes including emissions from stacks and on fence lines; constituent measurements of gas emissions from combustion systems, such as coal and gas power stations, on road and off road vehicles, aircraft and ships; constituent measurements from gas emissions from biogas systems; gas purity measurements of gas mixtures; measurements of natural gases emitted from volcanoes; measurements of gases emitted from explosives and chemical compounds; in-process gas measurements in chemical refining processes; identification and measurement of emissions from combustion processes.

The liquid chemical targets may comprise any one or a combination of any one of thiodiglycol (TDG) and heavier hydrocarbons (e.g. pentane, hexane, heptane, octane, benzene).

The aerosol liquid chemical targets may comprise any one or a combination of any one of diethyl phthalate (DEP); bis(2-ethylhexyl) sebacate (BES); aerosolised organophosphates, including chemical weapons agents and simulants of these—specifically dimethyl methylphosphonate (DMMP), trimethyl phosphate (TMP), diisopropyl methylphosphonate (DIMP); aerosols of long-chain hydrocarbon liquids, such as butane, pentane, hexane, heptane and n-alkanes (n>=4).

The solid chemical targets may comprise any one or a combination of any one of powders (such as, caffeine, paracetamol, L-glutamine, taurine, creatine, dextrose, aspirin, N-acetyl L-cysteine, inistol, leucine, beta-aniline; explosives and their residues (such as, 2,4,6-trinitrotoluene (TNT), aliphatic nitrate ester pentaerythritol tetranitrate (PETN), aliphatic nitra-mine 1,3,5-trinitroperhydro-1,3,5-triazine (RDX)); biological species (such as proteins, carbohydrates, lipids).

The open-path of the open-path measuring arrangement may be at least 0.1 meters long, preferably at least 10 meters long, more preferably at least meters long, and even more preferably at least 70 meters long.

For measuring gaseous chemical targets, the open-path is preferably at least meters long, more preferably at least 70 meters long. For measuring liquid chemical targets (including aerosol liquid chemical targets), the open-path is preferably at least 0.1 meters (10 centimeters) long. For measuring solid chemical targets, the open-path is preferably at least 0.1 meters (10 centimeters) long.

The active FTIR spectroscopy system may further comprise a scattering aid having a convex or a plane surface.

The scattering aid may be a non-compliant scattering aid, such as a pane of paper, concrete, laminate, wood, brick, stone, painted surface, metal or plastic.

Alternatively, the scattering aid may be a compliant—or optical—scattering aid, such as a high-quality retroreflector or a mirror.

The chemical targets are configured to be arranged in the open-path measuring arrangement between the launch system and the scattering aid such that an optical axis of the scattering aid is co-aligned with the optical axis of the launching path.

In accordance with a second aspect of the disclosure, there is provided a method for quantitative measurements of concentrations of chemical targets in an open-path measuring arrangement, the method comprising:
a) generating broadband IR light,
b) generating calibration light,
c) synchronously receiving and then modulating, by means of a scanning interferometer, the generated broadband IR light and the generated calibration light,
d) providing a launch system for illuminating the chemical targets with the modulated broadband IR light and a collector system for receiving the modulated broadband IR light spectrally-modulated by the chemical targets such that an optical axis of a launching path of the launch system is substantially co-aligned with an optical axis of the collector system,
e) providing a detector system for detecting and then recording spectra of interference fringes generated by the spectrally-modulated broadband IR light and by the modulated calibration light, and
f) providing a non-transitory computer readable medium encoded with a computer program, wherein the computer program comprises instructions stored therein for causing a computer processor to perform a plurality of functions to simultaneously compute concentrations of each of the chemical targets from spectra of the recorded interference fringes generated by the spectrally-modulated broadband IR light and by the modulated calibration light.

The plurality of functions may comprise simultaneously computing concentrations of each of the chemical targets by a) performing calibration and Fourier transformation of the recorded spectra of interference fringes generated by the spectrally-modulated broadband IR light and by the modulated calibration light to produce at least one absorption spectrum for the chemical targets, b) fitting library absorption spectra for each of the chemical targets and an extracted illumination spectrum of the generated broadband IR light to the at least one absorption spectrum, and then c) calculating concentrations of each of the chemical targets from said produced and said fitted spectrum.

The "library spectra" may comprise data from publicly available literature libraries and/or data from libraries created by the applicant of the present disclosure.

The method may further comprise providing a scattering aid having a convex or a plane surface, wherein the chemical targets are configured to be arranged in the open-path measuring arrangement between the launch system and the scattering aid such that an optical axis of the scattering aid is co-aligned with the optical axis of the launching path The method may be configured for quantitative measurements of concentrations of IR-absorbing gaseous, liquid (including aerosols) and/or powder chemical targets in an open-path measuring arrangement.

The method may be configured for "real-time detection" of IR-absorbing gaseous, liquid (including aerosols) and/or powder chemical targets, in that the method may be performed at an update rate sufficiently fast to observe dynamic changes in the concentrations of the chemical targets.

In accordance with a third aspect of the disclosure, there is provided a method of extracting, using a non-transitory computer readable medium encoded with a computer program, an illumination spectrum $I_o$ of a broadband IR light generated by an optical parametric oscillator in order to illuminate chemical targets arranged in an open-path measuring arrangement for the purpose of computing concentrations of each of the chemical targets, the method comprising the steps of:

a) storing to the non-transitory computer readable medium spectra I of interference fringes generated by spectrally-modulated broadband IR light upon illumination of the chemical targets, b) storing on the non-transitory computer readable medium library absorption spectra for at least one known concentration of each of the chemical targets, and c) encoding the medium with a computer program comprising instructions stored therein for causing a computer processor to perform an algorithm which allows the illumination spectrum $I_o$ to be modelled as a many-point spline function and to become a free parameter when fitting the library absorption spectra for each of the chemical targets to the spectra I of interference fringes generated by spectrally-modulated broadband IR light upon illumination of the chemical targets.

BRIEF DESCRIPTION OF THE DRAWINGS

Various aspects of the disclosure will now be described by way of example only and with reference to the accompanying drawings, of which.

DETAILED DESCRIPTION

Figure 1:
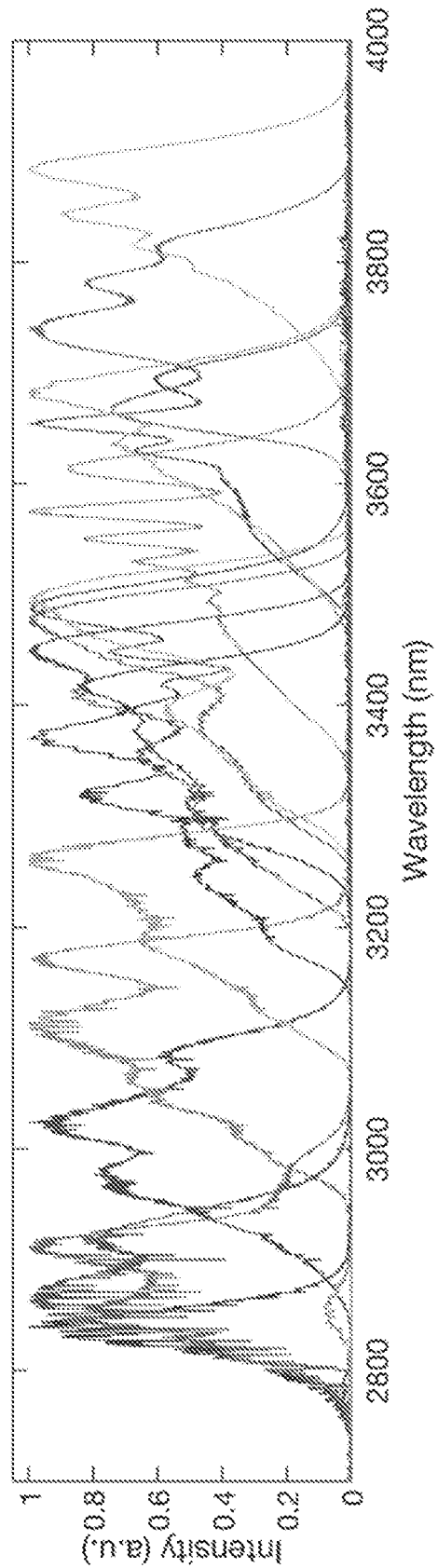
FIG. 1 shows the idler spectra produced by fan-out-grating tuning of the MgO:PPLN nonlinear crystal of the OPO.

In a preferred embodiment of the active FTIR spectroscopy system, the IR light source was an ultrafast OPO (Chromacity Ltd.) based on a fan-out-grating MgO:PPLN nonlinear crystal, which provided 100-MHz pulses with tunability from 2.6 µm-4.2 µm and broad spectra as shown in FIG. 1. To access the strongest absorptions in methane and ethane, the inventors selected a grating position that provided instantaneous coverage from 3.1-3.5 µm, with an average power >300 mW and a 1-cm-diameter beam with a measured beam factor M2 value of 1.05.

Figure 2:
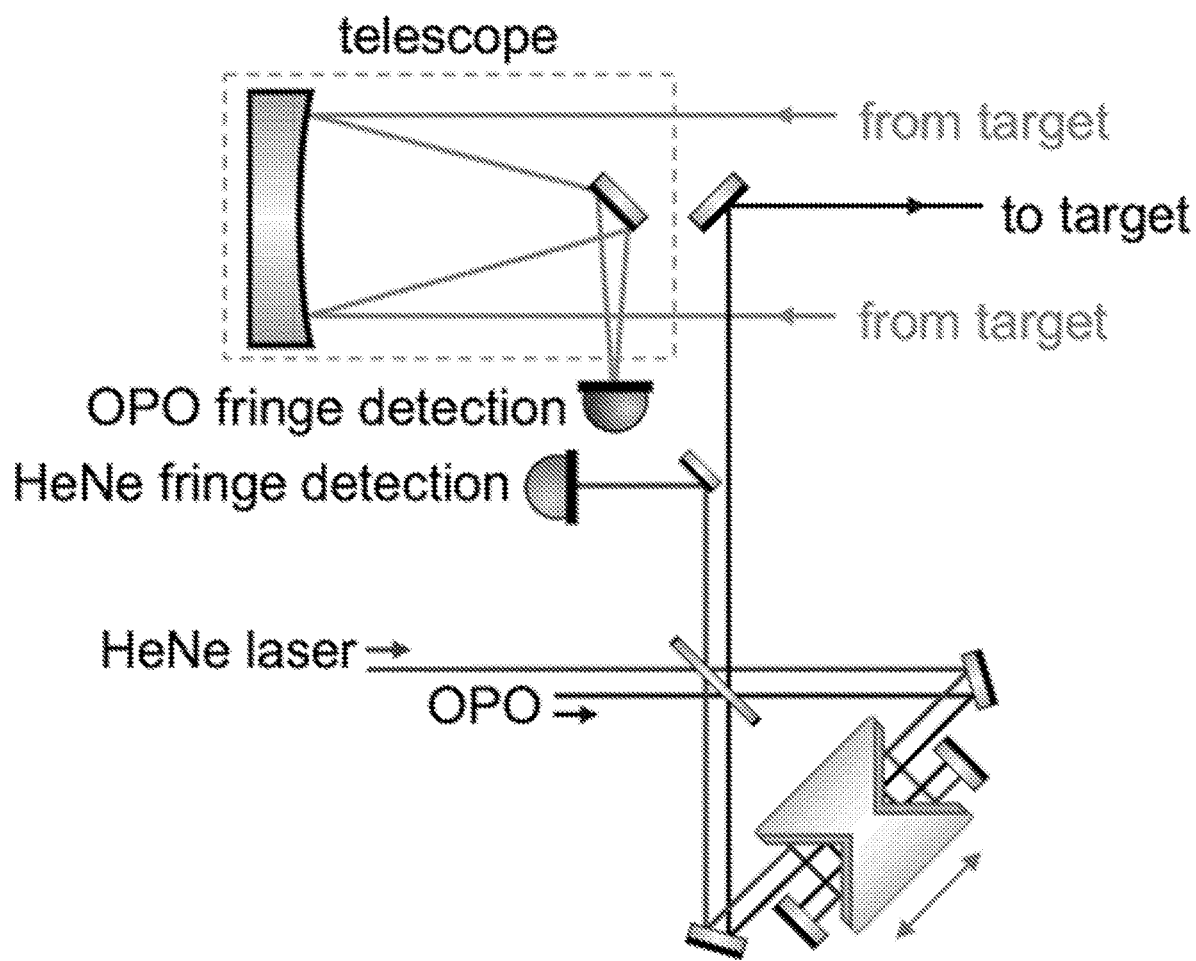
FIG. 2 shows the layout of an embodiment of the active FTIR spectroscopy system of the present disclosure.

In the layout of the active FTIR spectroscopy system shown in FIG. 2, the OPO light was first coupled into a scanning Michelson interferometer before being launched into free-space and subsequently collected by a 6-inch f/4 Newtonian telescope after scattering from a remote chemical target. The HeNe light was also coupled into the scanning Michelson interferometer before being collected by a silicon photodiode detector.

The returned light (i.e., the spectrally-modulated light) was detected using an InSb liquid-nitrogen-cooled photodiode situated at the telescope focus. Light from the OPO was launched along an optical axis co-aligned with the telescope's field of view using a small 45° steering mirror situated directly before the secondary mirror of the telescope. The scanning Michelson interferometer operated at 1 Hz and achieved a typical resolution of 0.05 cm$^{-1}$, which is sufficient to resolve the narrow and complex absorption-line structure of light molecules, such as water, methane and ethane. The entire system was constructed on a 60×90 cm breadboard and mounted on a trolley.

Simultaneous Methane, Ethane and Water Measurement at 30-m Range

To establish the ability of the system to measure multiple spectrally-overlapping species simultaneously, the inventors performed indoor measurements at a range of up to 30 meters in which the IR light launched from the OPO entered a 20-cm-long gas cell containing a 1.5±0.15% ethane in air mixture and situated directly after the launch mirror, which was situated immediately before the entrance aperture of the collection telescope.

Figure 4A:
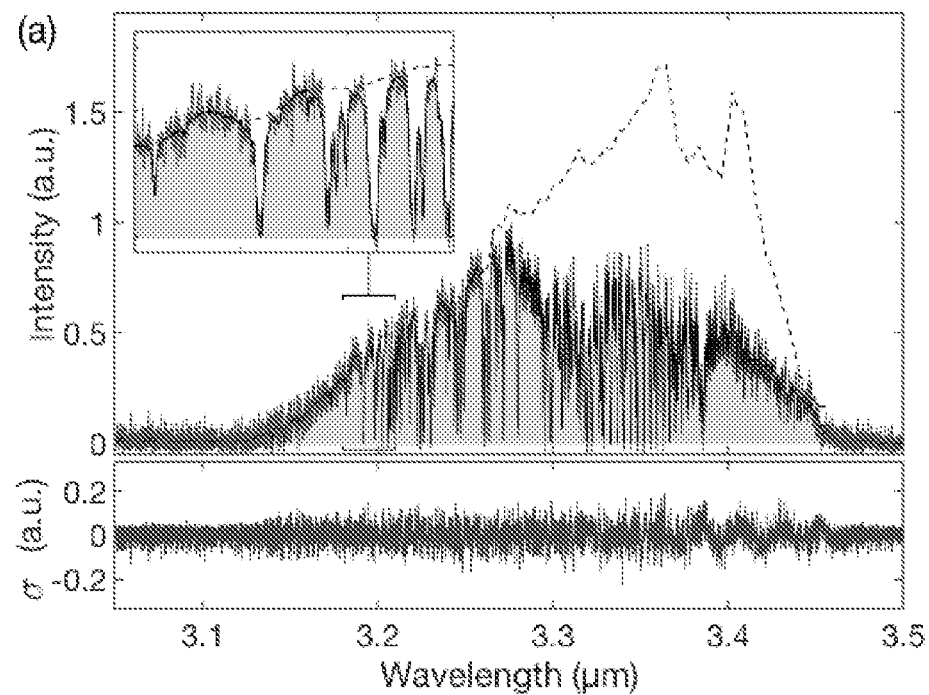
FIG. 4A shows an example spectrum from a set of 45 spectra collected at meters range using the system of FIG. 2.

FIG. 4A (solid area) displays an example of a single measured spectrum (no averaging) exhibiting densely packed absorption lines from water, methane and ethane, as well as continuum absorption from ethane, which suppresses the overall spectral intensity. FIG. 4A shows an example spectrum from a set of 45 collected at 30-m range from a rough aluminum-foil scattering aid. The upper plot shows the envelope of the illumination spectrum extracted from a fitting procedure which simultaneously minimized the rms error between the experimental spectrum (solid area) and a synthetic spectrum (black line at the top of the solid area) calculated from the envelope and a fitted mixture of PNNL absorbance data for water, methane and ethane. In this example, the best-fit concentrations determined were 1.15% (water), 1860 ppb (methane) and 1.37% (ethane). The lower plot shows the rms fitting residual.

Quantitative open-path spectroscopy requires either a reliable reference spectrum or a method of inferring the original illumination spectrum, and this problem has been treated in different ways in previously reported studies (G. B. Rieker, F. R. Giorgetta, W. C. Swann, J. Kofler, A. M. Zolot, L. C. Sinclair, E. Baumann, C. Cromer, G. Petron, C. Sweeney, P. P. Tans, I. Coddington, and N. R. Newbury, "Frequency-comb-based remote sensing of greenhouse gases over kilometer air paths," Optica 1, 290, 2014; L. Nugent-Glandorf, F. R. Giorgetta, and S. A. Diddams, "Open-air, broad-bandwidth trace gas sensing with a mid-infrared optical frequency comb," Applied Physics B 119, 327-338, 2015).

The approach taken by the inventors (discussed further below with reference to FIG. 8) results in the retrieval of an illumination spectrum (dashed upper line in FIG. 4A) which represents the OPO output spectrum prior to undergoing atmospheric absorption. The black line at the top of the solid area in FIG. 4A is the best-fit absorption spectrum using 0.1-cm$^{-1}$ PNNL library data as the fitting reference (S. W. Sharpe, T. J. Johnson, R. L. Sams, P. M. Chu, G. C. Rhoderick, and P. A. Johnson, "Gas-Phase Databases for Quantitative Infrared Spectroscopy," Appl. Spectrosc. 58, 1452-1461, 2004). The residual (bottom spectra in FIG. 4A) shows some deviations of order similar to the rms noise near the spectral lines due to mismatch between the measured line shapes and the PNNL data. The inset in FIG. 4A shows the typical correspondence between the measured spectrum and the best-fit data.

Figure 4B:
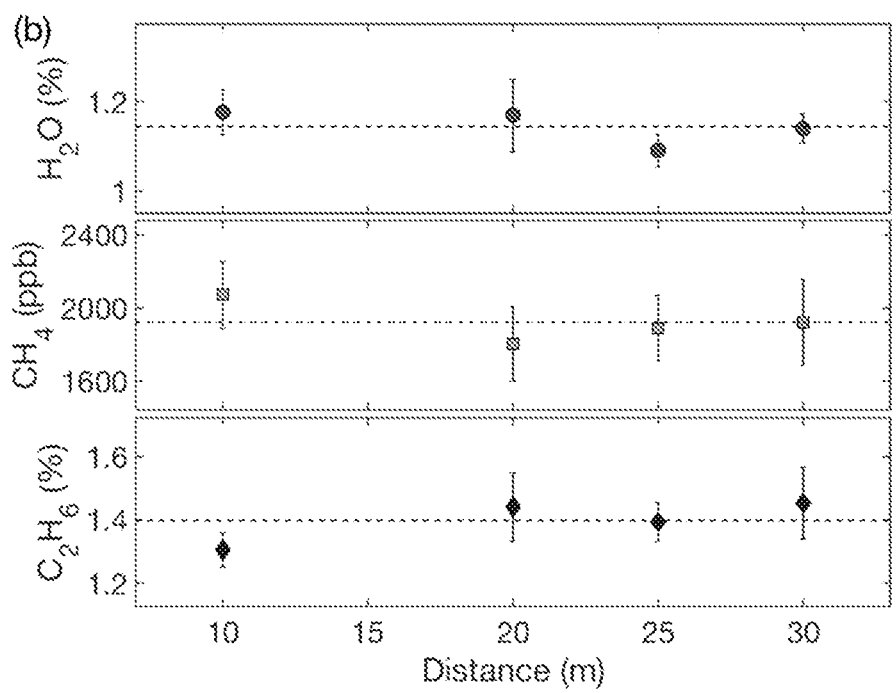
FIG. 4B shows measured concentrations at 10, 20, 25 and 30 meters, with data points showing the average values from approximately 45 spectra each, and the error bars showing the ±1 standard deviation range (the spectra was collected using the system of FIG. 2)

FIG. 4B shows the extracted concentration data for water, methane and ethane, showing that it is possible to obtain environmental concentration values consistent with independent humidity measurements (water), established ambient levels (methane) or known control concentrations (ethane).

Measured concentrations at 10, 20, 25 and 30 m, with data points showing the average values from approximately 45 spectra each, and the error bars showing the ±1 standard deviation range are shown in FIG. 4B. The methane background value is consistent with reported ambient levels measured at 1885±15 ppb (E. J. Dlugokencky, A. M. Crotwell, P. M. Lang, J. W. Mund and, M. E. Rhodes (2018), "Atmospheric Methane Dry Air Mole Fractions from quasi-continuous measurements at Barrow, Alaska and Mauna Loa, Hawaii, 1986-2017," Version: 2018-03-19, Path: ftp://aftp.cmdl.noaa.gov/data/trace_gases/ch4/in-situ/surface/). Respective water and ethane values were consistent with the ambient relative humidity measured in the building and the filling concentration of the ethane cell. The dashed lines show the average of all the measured values.

Real-Time Methane Emission Measurement at 70-m Range

Using a 78-m indoor corridor as a test site, the inventors simulated a point emission by releasing a 2% methane:air mix for 100 seconds at a rate of 103 μg s$^{-1}$ at a distance of 65 m from the OPO. The signal was recorded from a simple target of rough aluminum foil situated 70 meters from the OPO, with the beam passing near the emission point. No ethane cell was present. The spectra recorded every seven seconds were fitted in the same way as described previously to provide concentrations of water, methane and ethane.

Figure 5A:
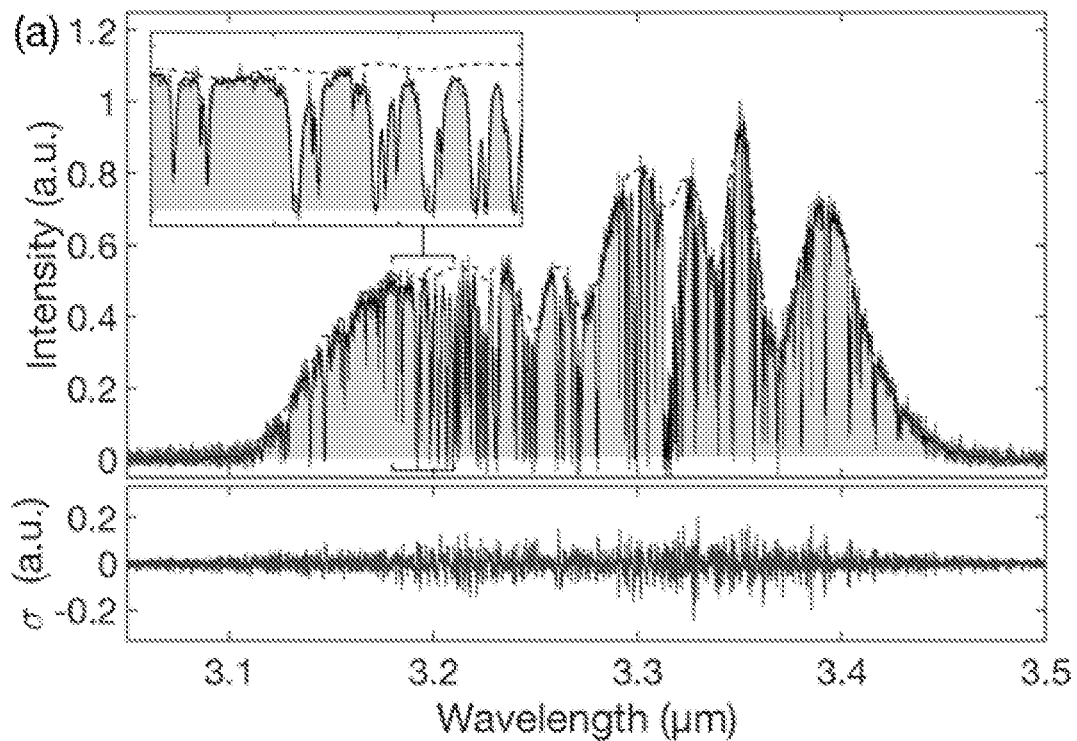
FIG. 5A shows an example spectrum from a set of 51 spectra collected at 70 meters range using the system of FIG. 2.

Although ethane concentration remained as an available fitting parameter, as expected, the resulting fitted concentration was negligible since ethane is not naturally present in the atmosphere. FIG. 5A shows an example of a spectrum recorded without averaging at 70-m range and at a moment close to the peak methane emission. The Q-branch of methane can be clearly seen near 3.3 μm. The inset of FIG. 5A shows the correspondence to the best-fit PNNL database in the 3.18-3.21 μm region. In contrast to ethane, methane and water show very little continuum absorption under these experimental conditions (20° C., 101800 Pa), so the inferred illumination spectrum closely follows the envelope of the measured spectrum.

Figure 5B:
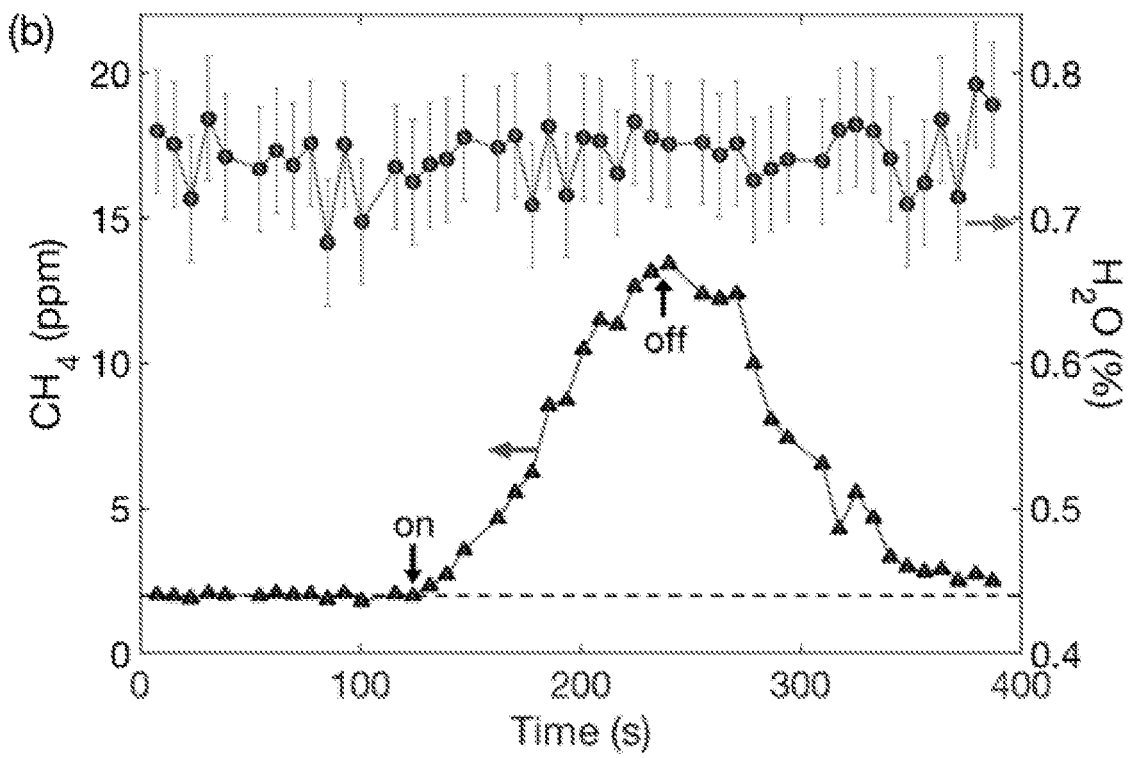
FIG. 5B shows measured concentrations of methane (lower curve) and water (upper curve) measured before, during and after the methane release using the system of FIG. 2.

FIG. 5B presents the measured water (upper line) and methane (lower line) concentrations over 400 seconds, showing the methane concentration rising from background levels (~1900 ppb) to a peak of around 13000 ppb before returning to near the original value as the gas disperses. Prior to the methane release, the rms variation of the measured concentration of background methane at this range was <100 ppb. Water showed more variability, which is expected to be associated with convection effects and environmental variations.

Detection Sensitivity, Repeatability and Accuracy

Sensitivity to path integrated concentrations of a few ppb can be achieved by averaging multiple spectra. Using a 35-m-range aluminum-foil target, and with the OPO tuned away from the strongest methane and water absorption lines, the inventors averaged 1250 spectra over one hour to obtain the spectrum shown in FIG. 6. As before, the dashed line is the fitted illumination spectrum, the solid area depicts the (averaged) experimental data and the black line at the top of the solid area is the combined envelope and absorption-line fit, in this case using HITRAN data for methane, water-vapor and carbon dioxide (L. S. Rothman et al., "The HITRAN2012 molecular spectroscopic database," J. Quant. Spectrosc. Radiat. Transf. 130, 4-50, 2013).

The use of HITRAN avoided an artefact in the PNNL data which introduced a weak continuum absorption in methane, of minimal impact when fitting individual spectra, but observable when fitting a low-noise averaged spectrum. The quality of the fit can be seen from the inset of FIG. 6, which compares the fitted and average spectra, with a 0.1-cm$^{-1}$ instrument response imposed on the HITRAN data. The best-fit concentrations were 0.977% water, 1830 ppb methane and no carbon dioxide (as expected in this wavelength band). Small differences between the experimental and HITRAN line shapes are observed in the residuals.

Figure 6:
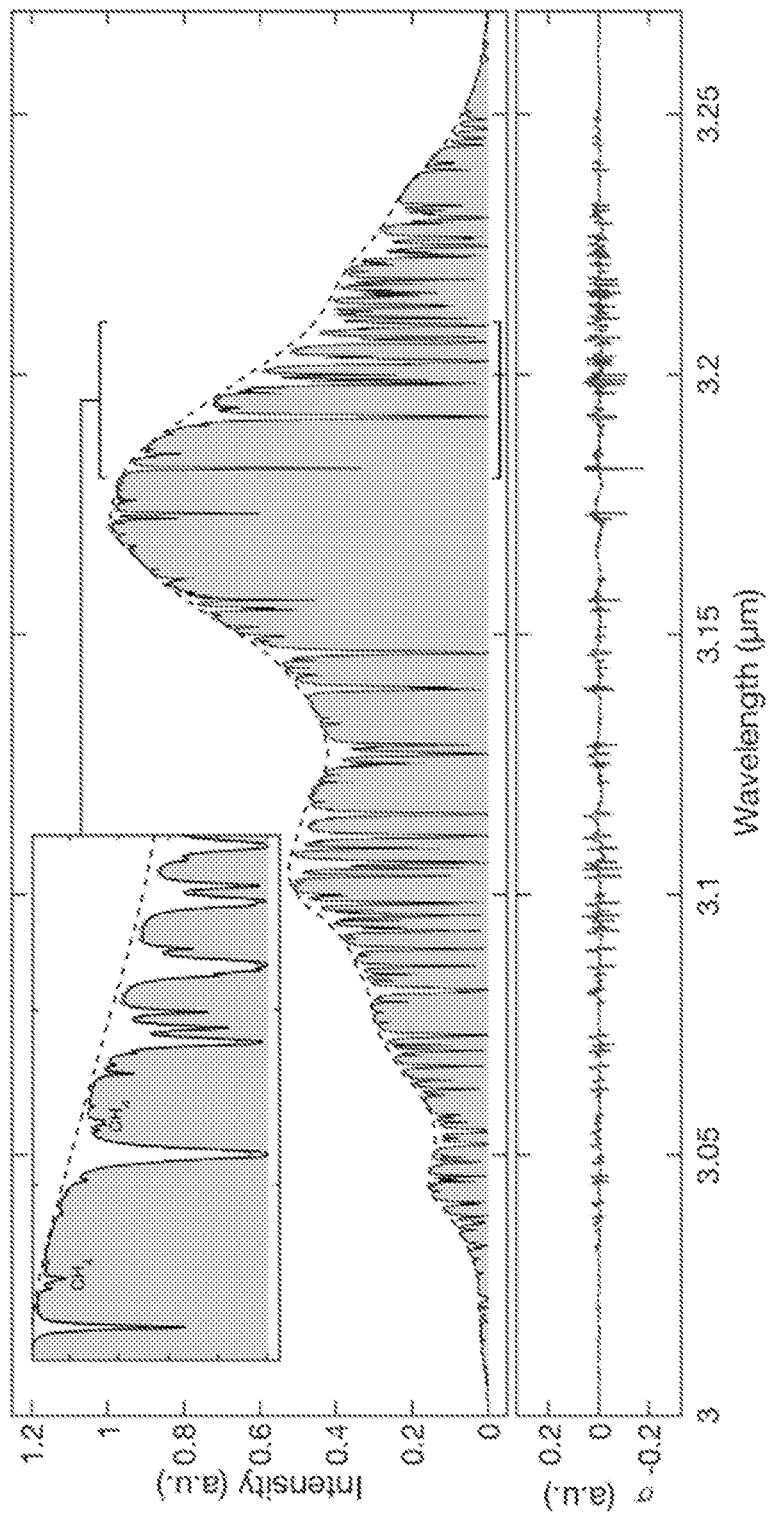
FIG. 6 shows measured data of the average of 1250 spectra acquired (using the system of FIG. 2) over a 35 meters indoor range (shaded area), and a comparison with the best-fit HITRAN data (dashed black line) for water vapor and methane.

The rms error in absorption-free regions is 0.19%, and this figure can be used to infer a detection sensitivity of 97 ppb for methane at this range and in this wavelength band, where the absorbance is characteristically weak (see FIG. 6, inset). Tuning the OPO to 3.3 μm encounters the strongest methane absorption (the Q-branch), and at this wavelength, the equivalent detection sensitivity would be 17 ppb.

A comparison can be made with commercial open-path Fourier-transform spectrometers, for which a survey of 64 common gases (George M. Russwurm, Jeffrey W. Childers, "FT-IR Open-path Monitoring Guidance Document," U.S. Environmental Protection Agency, Human Exposure and Atmospheric Sciences Division, National Exposure Research Laboratory, 1999) reported a sensitivity of 1597 ppb·m for methane measurements near 3017 $cm^{-1}$ (or 3.3 μm) (Q-branch absorption). A leading commercial system reports 2 ppb detection sensitivity for methane at 200 m range with 1 hour of averaging (Bruker, "D-fenceline™ and OPS", www.brukeropenpath.com at the following path: /atmosfir-d-fenceline/) The equivalent performance of the FTIR system of the present disclosure is 595 ppb·m or 1.5 ppb (1 hour average), but critically this is achieved without the need for a precision retroreflector-array target.

While averaging is advantageous from a noise point of view, the stability of the atmosphere ultimately limits the accuracy and repeatability of the measurements which can be obtained. All the measurements reported by the inventors were performed indoors, where convection and temperature changes were the principal causes of fluctuations in the concentrations and/or absorbances of ambient water vapor and methane.

Figure 7:
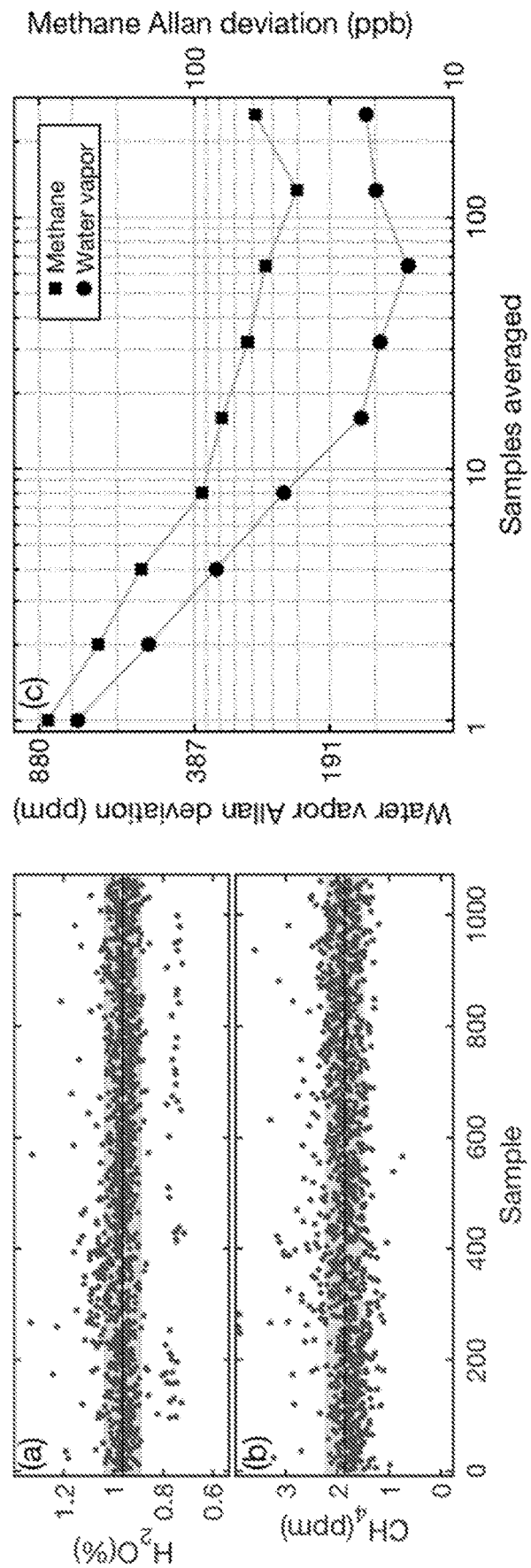
FIG. 7 shows the results of fitting to 1063 individual spectra acquired (using the system of FIG. 2) over a 35 meters indoor range, showing concentrations for water vapor (a), methane (b) and the Allan deviation analysis (c)

Using the same dataset as in FIG. 6, the inventors present in FIG. 7 the results of individual fits to each spectrum, showing mean concentrations and standard deviations for methane and water vapor of 1861±349 ppb and 0.963±0.0725% respectively. Around 200 spectra for which the fitting error was exceptionally high were removed prior to the analysis. The mean concentration values agree closely with the best fit concentrations of the average spectrum (FIG. 6). The Allan deviation (graph (c) in FIG. 7) provides an insight into the stability and repeatability of the measurements, showing that averaging around 100 results (~5 minutes of acquisition time) provides the greatest repeatability, but with longer acquisitions showing slightly higher fluctuations in the mean, particularly for water vapor, whose concentration changes sensitively with temperature. A tradeoff between repeatability and sensitivity is therefore encountered at acquisition times above 5-10 minutes.

Extraction of the Illumination Spectrum of the Broadband IR Light

The Beer-Lambert law describes the absorbance in terms of the light intensity before ($I_o$) and after (I) an absorbing medium, according to $I=I_o \exp(-\alpha)$, where I, $I_o$ and α are functions of wavelength. Quantitative spectroscopy relies on inverting the Beer-Lambert law to obtain the absorbance, $\alpha=-\log(I/I_o)$, which requires accurate knowledge of the illumination intensity before the sample.

In a laboratory measurement, a spectrum can be recorded without the sample and another spectrum with the sample present, but in a remote sensing context it is impossible to run a control experiment where the atmosphere is absent, so this option is unavailable.

An alternative laboratory approach employs a reference detector to record the instantaneous intensity of the illumination source ($I_o$) in tandem with the intensity after the sample (I), so providing the desired $I/I_o$ ratio. In a free-space atmospheric measurement, this approach also fails because a local reference detector cannot account for systematic effects like unknown contributions to the spectral envelope of the light from the scattering target or the propagation path.

To learn the effective illumination spectrum the solution is to allow $I_o$ to be an additional free parameter when fitting the molecular absorbances to the measured spectrum, however fitting a structured spectral envelope from a broadband OPO is challenging, since it must be described by many more free points than the gas, liquid and solid absorbances, which (neglecting temperature and pressure corrections) need just one number per chemical species fitted. Performing a global multi-point optimisation from a naïve initial guess is slow and failure-prone because of many local minima in the optimization landscape.

Instead, the inventors first obtain a rapid, accurate estimate of $I_o$ and the absorbance values from a piecewise fitting of small fragments of the measured spectrum, then use these as a robust starting point to refine the values in a full-spectrum fit. This approach combines the baseline removal reported for free-space spectroscopy using dual combs at 1.55 μm (G. B. Rieker et al, "Frequency-comb-based remote sensing of greenhouse gases over kilometer air paths," Optica 1, 290, 2014) and the global optimization used in dual-comb spectroscopy with OPGaP OPOs (O. Kara, L. Maidment, T. Gardiner, P. G. Schunemann, and D. T. Reid, "Dual-comb spectroscopy in the spectral fingerprint region using OPGaP optical parametric oscillators," Opt. Express 25, 32713-32721, 2017).

For species like water and methane that exhibit no band-continuum absorption the inventors note that another strategy is to reconstruct an envelope from the points between the absorption lines (L. Nugent-Glandorf, F. R. Giorgetta, and S. A. Diddams, "Open-air, broad-bandwidth trace gas sensing with a mid-infrared optical frequency comb," Applied Physics B 119, 327-338, 2015), but this approach cannot deal with spectra from heavier alkanes like ethane and propane.

Figure 8:
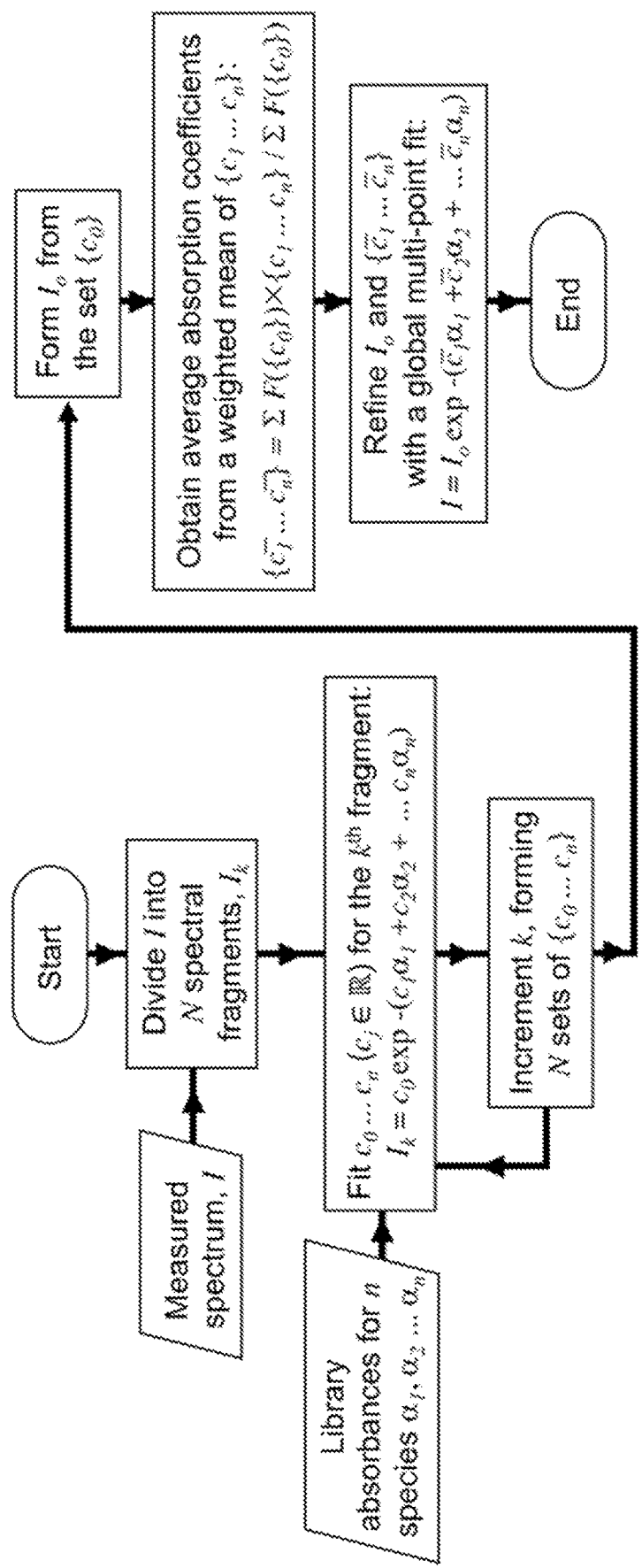
FIG. 8 shows the algorithm for the method of extracting the Illumination spectrum of the broadband IR light generated by the OPO.

With reference to FIG. 8, the algorithm comprises a plurality of functions comprising:
i. dividing the stored scattered broadband IR light spectrum, I into N spectral segments, $I_N$ (of approximately 1 $cm^{-1}$), for each of which the illumination intensity can be considered constant
ii. for n target chemicals, dividing the library spectrum of each into N spectral segments, matching in wavelength the segments of the IR light spectrum
iii. for each segment of the IR light spectrum, estimating the concentrations of the n chemical targets by fitting n+1 free parameters, specifically the local illumination intensity co and n absorption coefficients $\{c_1 \ldots c_n\}$, which together modify the library spectra to provide a simulated spectrum exhibiting the lowest root-mean-squared difference from the measured spectrum of the IR light over the spectral segment
iv. combining N sets of coefficients $\{c_1 \ldots c_n\}^1 \ldots \{c_1 \ldots c_n\}^N$ using a weighting function F(x) (for example, $F(x)=x^3$) to provide an initial estimate of the absorption coefficients for n target chemicals: $\{\bar{c}_1 \ldots \bar{c}_n\} = \Sigma F(\{c_0\}) \times \{c_1 \ldots c_n\}/\Sigma F(\{c_0\})$
v. concatenating the set of N values, $\{c_o\}$, which describe the local illumination intensities for each spectral segment, to provide an initial estimate of the full illumination spectrum $I_0$, where necessary using an interpolation function (e.g. a spline) to provide values of $I_o$ at all wavelengths contained in the measured spectrum of the IR light vi. combining, then iteratively optimizing, the estimated full illumination spectrum $I_o$ and the estimated absorption coefficients, $\{\bar{c}_1 \ldots \bar{c}_n\}$, for the n target chemicals to modify the library spectra to provide a simulated spectrum exhibiting the lowest root-mean-squared difference from the complete measured spectrum of the IR light, and in so doing to obtain the best-fit concentrations and illumination envelope.

Figure 3:
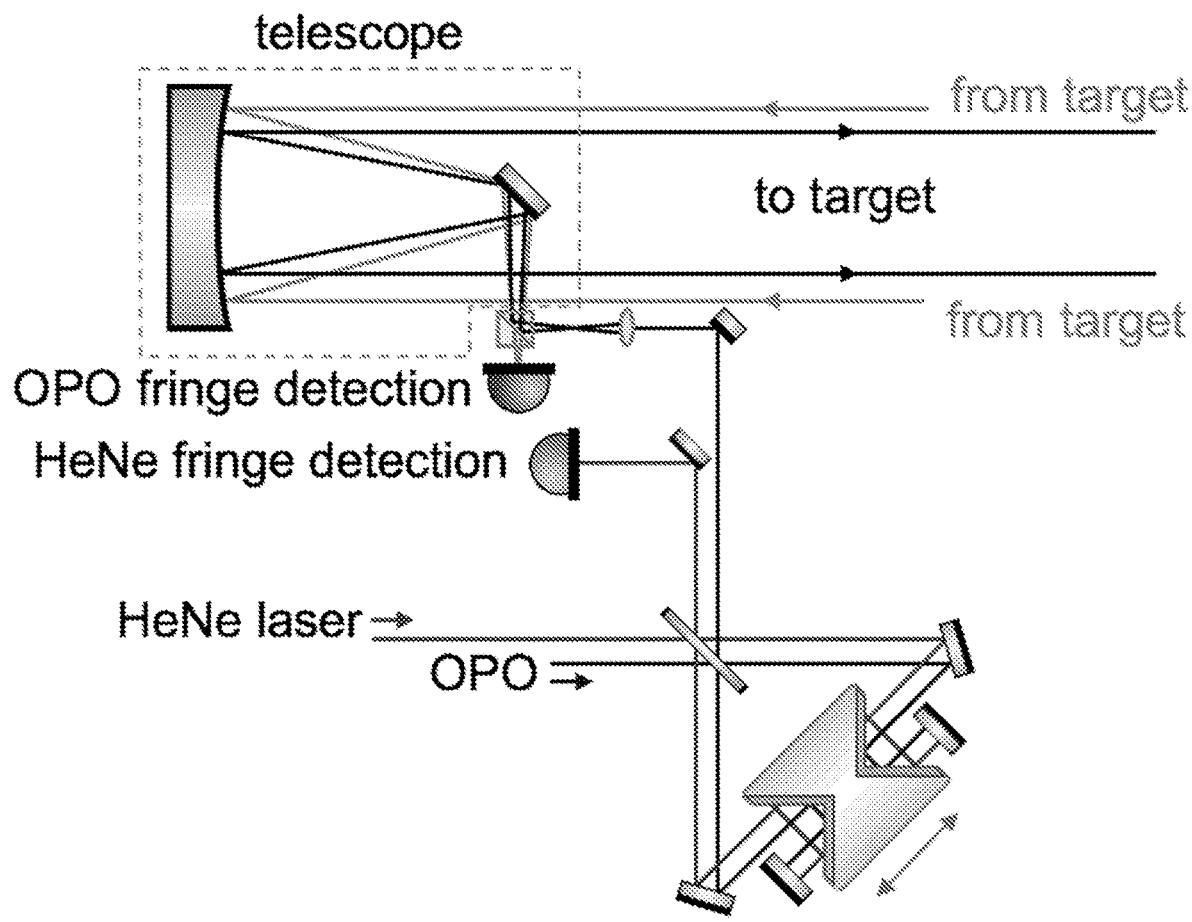
FIG. 3 shows the layout of another embodiment of the active FTIR spectroscopy system of the present disclosure.

Although illustrative embodiments of the disclosure have been disclosed in detail herein, with reference to the accompanying drawings, it is understood that the disclosure is not limited to the precise embodiment and that various changes and modifications can be effected therein by one skilled in the art without departing from the scope of the invention as defined by the appended claims and their equivalents. For example, FIG. 3 shows an active FTIR spectroscopy system based on that of FIG. 2, but with a different layout for the steering arrangement. In this case, the modulated IR light is coupled-out (to illuminate the chemical targets) via the telescope of the collector system itself, and so combining the functionality of the set of launch & collection systems. In such a layout, the modulated IR light would be coupled into the system confocally with the detector system (with a requirement of optical axis coalignment still be required).

The invention claimed is:

1. An active FTIR spectroscopy system for quantitative measurements of concentrations of chemical targets in an open-path measuring arrangement, the system comprising:
   an illumination source comprising an optical parametric oscillator configured to generate broadband IR light,
   a calibration source configured to generate calibration light,
   a scanning interferometer arranged to
   synchronously receive each of the broadband IR light and the calibration light, and
   then modulate each of the received broadband IR light and calibration light over a scanning period,
   with the received calibration light being configured to deduce optical path differences introduced by the scanning interferometer over the scanning period for each of the modulated broadband IR light and the modulated calibration light,
   a launch system for illuminating the chemical targets with the modulated broadband IR light,
   a collector system for receiving broadband IR light spectrally-modulated by the chemical targets,
   wherein the launch system is configured so that an optical axis of a launching path is substantially co-aligned with an optical axis of the collector system,
   a detector system for detecting and then recording interference fringes generated by the spectrally-modulated broadband IR light and by the modulated calibration light,
   a computer processor, and
   a non-transitory computer readable medium encoded with a computer program,
   wherein the computer program comprises instructions stored therein for causing the computer processor to perform a plurality of functions to simultaneously compute concentrations of each of the chemical targets from spectra of the recorded interference fringes generated by the spectrally-modulated broadband IR light and by the modulated calibration light;
   wherein the computer processor is configured to extract an effective illumination spectrum of infrared light illuminating the chemical targets and using the effective illumination spectrum to simultaneously compute the concentrations of each of the chemical targets.

2. The system of claim 1, wherein the optical parametric oscillator comprises a nonlinear crystal tunable to generate broadband IR light with wavelengths from 1 µm to 16 µm, or from 2.5 µm to 4.5 µm, or from 2.8 µm to 3.9 µm, or from 3.1 µm to 3.5 µm.

3. The system of claim 1, wherein the optical parametric oscillator is configured to generate broadband IR light with an average output power of at least 10 mW, or at least 50 mW, or at least 250 mW, or least 500 mW; or
   wherein the optical parametric oscillator is configured to generate broadband IR light with a repetition rate from 1 MHz to 20 GHz, or from 10 MHz to 10 GHz, or from 70 MHz to 1 GHz, or from 90 MHz to 500 MHz.

4. The system of claim 1, wherein the calibration source comprises any one of a wavelength stabilized laser source or a narrow-line diode laser source.

5. The system of claim 1, wherein the scanning interferometer is configured to modulate the received broadband IR light with a resolution of less than 0.5 cm$^{-1}$, or less than 0.1 cm$^{-1}$, or less than 0.07 cm$^{-1}$, or less than 0.05 cm$^{-1}$; or
   wherein the scanning interferometer is configured to modulate the received broadband IR light at scanning rates from 0.1 Hz to 1000 Hz, or from 0.5 Hz to 100 Hz, or from 0.7 Hz to 10 Hz; or
   wherein the scanning interferometer is configured to modulate the received broadband IR light with an average power of at least 1 mW, or at least 20 mW, or at least 70 mW, or at least 100 mW.

6. The system of claim 1, wherein the scanning interferometer comprises at least one moving retroreflector, the moving retroreflector being arranged to increase the optical paths introduced by the scanning interferometer over the scanning period for each of the modulated broadband IR light and the modulated calibration light.

7. The system of claim 1, wherein the launch system comprises a steering arrangement, the steering arrangement comprising a steering minor or a steering prism,
   wherein the steering mirror is arranged at 45° with respect to the optical axis of the launching path.

8. The system of claim 1, wherein the collector system comprises a telescope, and
   wherein the telescope comprises a reflecting telescope or a refracting telescope.

9. The system of claim 8, wherein the collector system further comprises an optical relay arrangement, the optical relay arrangement comprising one or more of a minor, a lens or a prism, or a combination thereof, for relaying the received spectrally-modulated broadband IR light onto the detector system.

10. The system of claim 9, wherein the steering arrangement of the launch system is configured to be arranged adjacent the optical relay arrangement of the collector system such that the optical axis of the launching path is co-aligned with the optical axis of the collector system.

11. The system of claim 1, wherein the detector system comprises a combination of an IR detector for detecting spectra of interference fringes generated by the spectrally-modulated broadband IR light and a photodiode or a phototransistor for detecting spectra of interference fringes generated by the modulated calibration light.

12. The system of claim 1, wherein the detector system further comprises a digital signal acquisition system configured to record at least one spectrum of interference fringes generated by the spectrally-modulated broadband IR light in synchronism with at least one spectrum of interference fringes generated by the modulated calibration light such that the interference fringes of the modulated calibration light are configured to provide an accurate timebase calibration for the interference fringes of the spectrally-modulated broadband IR light to enable calculating an accurate wavelength scale for the at least one spectrum of interference fringes generated by the spectrally-modulated broadband IR light.

13. The system of claim 1, wherein the broadband IR light spectrally-modulated by the chemical targets comprises spectral-modulation by backscattering or absorption or diffuse reflectance of the broadband IR light.

14. The system of claim 1, wherein the plurality of functions comprises simultaneously computing concentrations of each of the chemical targets by
performing calibration and Fourier transformation of the recorded spectra of interference fringes generated by the spectrally-modulated broadband IR light and by the modulated calibration light to produce at least one absorption spectrum for the chemical targets,
fitting library absorption spectra for each of the chemical targets and the extracted effective illumination spectrum of the generated broadband IR light to the at least one absorption spectrum, and then
calculating concentrations of each of the chemical targets from said produced and said fitted spectrum.

15. The system of claim 1, wherein the non-transitory computer readable medium is configured to store
i) spectra I of interference fringes generated by spectrally-modulated broadband IR light upon illumination of the chemical targets, and
ii) library absorption spectra for at least one known concentration of each of the chemical targets, and
wherein the non-transitory computer readable medium is encoded with a computer program comprising instructions stored therein for causing the computer processor to perform an algorithm which allows the effective illumination spectrum Io to be modelled as an interpolation function and to become a free parameter when fitting the library absorption spectra for each of the chemical targets to the spectra I of interference fringes generated by spectrally-modulated broadband IR light upon illumination of the chemical targets.

16. The system of claim 1, wherein the open-path of the open-path measuring arrangement is at least 0.1 meters long, or at least 10 meters long, or at least 30 meters long, or at least 70 meters long.

17. The system of claim 1, further comprising a scattering aid having a convex or a plane surface, wherein the scattering aid comprises a pane of paper, concrete, laminate, wood, brick, stone, painted surface, metal or plastic.

18. The system of claim 17, wherein the chemical targets are configured to be arranged in the open-path measuring arrangement between the launch system and the scattering aid such that an optical axis of the scattering aid is co-aligned with the optical axis of the launching path.

19. The system of claim 1, wherein the system is configured for quantitative measurements of concentrations of IR-absorbing gaseous, liquid, aerosol or powder chemical targets in an open-path measuring arrangement.

20. A method for quantitative measurements of concentrations of chemical targets in an open-path measuring arrangement, the method comprising:
providing an active FTIR spectroscopy system according to claim 1.

21. A method for quantitative measurements of concentrations of chemical targets in an open-path measuring arrangement, the method comprising:
generating broadband IR light,
generating calibration light,
synchronously receiving and then modulating, by means of a scanning interferometer, the generated broadband IR light and the generated calibration light,
providing a launch system for illuminating the chemical targets with the modulated broadband IR light and a collector system for receiving the modulated broadband IR light spectrally-modulated by the chemical targets such that an optical axis of a launching path of the launch system is substantially co-aligned with an optical axis of the collector system,
providing a detector system for detecting and then recording spectra of interference fringes generated by the spectrally-modulated broadband IR light and by the modulated calibration light,
providing a computer processor,
providing a non-transitory computer readable medium encoded with a computer program,
wherein the computer program comprises instructions stored therein for causing a computer processor to perform a plurality of functions to simultaneously compute concentrations of each of the chemical targets from spectra of the recorded interference fringes generated by the spectrally-modulated broadband IR light and by the modulated calibration light; and
extracting an effective illumination spectrum of infrared light illuminating the chemical targets and using the effective illumination spectrum to simultaneously compute the concentrations of each of the chemical targets.

22. The method of claim 21, wherein the determining by the plurality of functions comprises simultaneously computing concentrations of each of the chemical targets by
performing calibration and Fourier transformation of the recorded spectra of interference fringes generated by the spectrally-modulated broadband IR light and by the modulated calibration light to produce at least one absorption spectrum for the chemical targets,
fitting library absorption spectra for each of the chemical targets and the extracted illumination spectrum of the generated broadband IR light to the at least one absorption spectrum, and then
calculating concentrations of each of the chemical targets from said produced and said fitted spectrum.

23. The method of claim 21, further comprising providing a scattering aid having a convex or a plane surface, wherein the chemical targets are configured to be arranged in the open-path measuring arrangement between the launch system and the scattering aid such that an optical axis of the scattering aid is co-aligned with the optical axis of the launching path; and wherein the method is configured for quantitative measurements of concentrations of IR-absorbing gaseous, liquid, aerosol or powder chemical targets in an open-path measuring arrangement.

24. A method of extracting, using a non-transitory computer readable medium encoded with a computer program, an effective illumination spectrum $I_o$ of a broadband IR light generated by an optical parametric oscillator in order to illuminate chemical targets arranged in an open-path measuring arrangement for the purpose of computing concentrations of each of the chemical targets, the method comprising the steps of:

storing to the non-transitory computer readable medium spectra I of interference fringes generated by spectrally-modulated broadband IR light upon illumination of the chemical targets, storing on the non-transitory computer readable medium library absorption spectra for at least one known concentration of each of the chemical targets, and encoding the medium with a computer program comprising instructions stored therein for causing a computer processor to perform an algorithm which allows the effective illumination spectrum $I_o$ to be modelled as a many-point spline function and to become a free parameter when fitting the library absorption spectra for each of the chemical targets to the spectra I of interference fringes generated by spectrally-modulated broadband IR light upon illumination of the chemical targets.

\* \* \* \* \*